July 10, 1928.
E. L. HECKMAN
1,677,082
STEERING WHEEL
Filed June 24, 1927
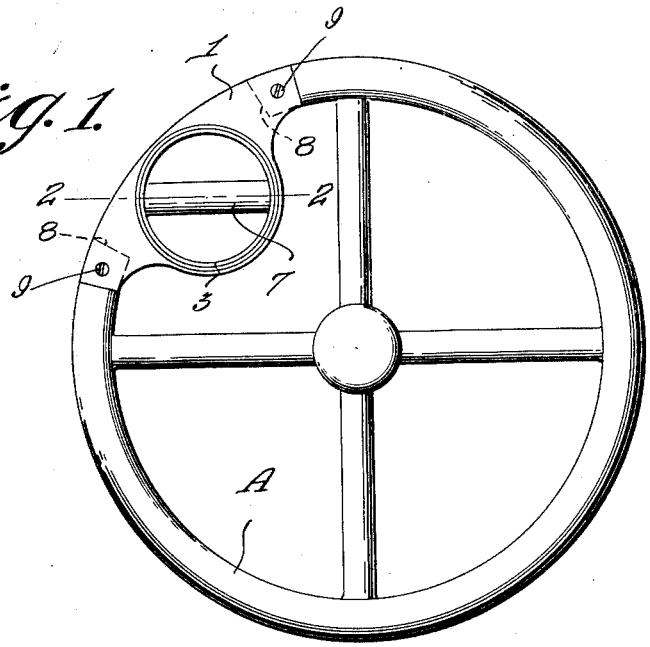
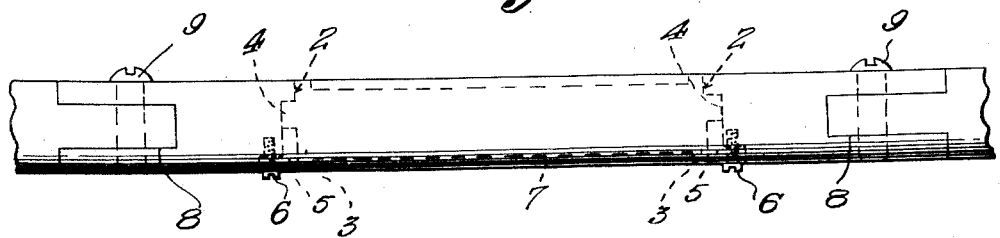
Edward L. Heckman,
INVENTOR
BY Victor J. Evans
ATTORNEY
WITNESS:

Patented July 10, 1928.

1,677,082

UNITED STATES PATENT OFFICE.

EDWARD L. HECKMAN, OF NOTRE DAME, INDIANA.

STEERING WHEEL.

Application filed June 24, 1927. Serial No. 201,230.

This invention relates to improvements in steering wheels for vehicles, the general object of the invention being to provide an auxiliary wheel which is so associated with the main wheel that the main wheel can be turned without difficulty by one hand, thus leaving the other hand of the driver free to perform other operations.

Another object of the invention is to so construct the device that it may be easily connected with a steering wheel.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view of a steering wheel, showing the invention applied thereto.

Figure 2 is a section on line 2—2 of Figure 1.

Figure 3 is an enlarged fragmentary edge view of a steering wheel, showing how the invention is attached thereto.

In these views, 1 indicates a frame which is provided with a circular opening 2 of two diameters and 3 indicates a ring which is of a diameter to snugly fit in the small diameter of the opening 2, and said ring is provided with an external rib 4 which fits in the upper part of the large diameter of the opening. The ring is held in place by a ring 5 of angle shape in cross section which fits in the lower part of the opening 2 and abuts against the under edge of the rib 4, the horizontal part of the ring 5 fitting in a recess made in the frame 1 around the opening 2 and being held in said recess by the screws 6. Thus the ring 3 is rotatably mounted in the frame. The ring 3 is formed with a cross bar 7 which is diametrically arranged.

The outer edge of the frame 1 is of curved shape and in fastening the device to a steering wheel, such as shown at A, I cut away a portion of the rim of said wheel and tongue the ends of the rim, said tongues fitting in the notches 8 formed in the ends of the frame, after which the frame is fastened to the rim by the screws 9. Of course, if desired, the frame could be attached to the wheel above the rim of the wheel by either clamps or screws, as I do not wish to be limited to the exact manner of fastening the device to a steering wheel.

From the foregoing it will be seen that the ring 3 with its cross bar 7 is rotatably mounted in the frame 1 and that this cross bar 7 forms a hand grip for the hand of a driver of a vehicle, so that he can turn the steering mechanism by one hand and the steering wheel can be turned clear around without removing the hand from the cross bar.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a steering wheel of a vehicle, a frame connected with said wheel, a ring rotatably mounted in the frame and a cross piece carried by the ring and forming a hand grip.

2. In combination with a steering wheel of a vehicle, a frame connected with a portion of the rim thereof and having a circular opening therein, a ring rotatably mounted in said opening and a cross piece carried by the ring and forming a hand grip.

In testimony whereof I affix my signature.

EDWARD L. HECKMAN.